(12) United States Patent
Sleeman

(10) Patent No.: US 8,621,942 B2
(45) Date of Patent: Jan. 7, 2014

(54) FORCE SENSOR WITH COMPRESSIBLE ELECTRODE

(75) Inventor: Peter Sleeman, Waterlooville (GB)

(73) Assignee: Atmel Corporation, San Jose, CA (US)

( * ) Notice: Subject to any disclaimer, the term of this patent is extended or adjusted under 35 U.S.C. 154(b) by 222 days.

(21) Appl. No.: 12/534,753

(22) Filed: Aug. 3, 2009

(65) Prior Publication Data

US 2011/0023631 A1    Feb. 3, 2011

(51) Int. Cl.
    *G01L 1/00*    (2006.01)

(52) U.S. Cl.
    USPC .................................. 73/862.626

(58) Field of Classification Search
    USPC ................ 73/862.626, 780, 862.68
    See application file for complete search history.

(56) References Cited

U.S. PATENT DOCUMENTS

| | | | |
|---|---|---|---|
| 3,260,904 A * | 7/1966 | Booe ............................. 361/313 |
| 3,875,481 A * | 4/1975 | Miller et al. ............... 361/283.1 |
| 4,644,801 A * | 2/1987 | Kustanovich ............ 73/862.046 |
| 4,852,443 A * | 8/1989 | Duncan et al. .................. 84/733 |
| 5,597,984 A * | 1/1997 | Mohaupt ................... 177/210 C |
| 6,002,389 A * | 12/1999 | Kasser .......................... 345/173 |
| 6,006,386 A * | 12/1999 | Mohaupt .................... 73/862.68 |
| 6,282,081 B1 * | 8/2001 | Takabayashi et al. ........ 361/502 |
| 6,568,274 B1 * | 5/2003 | Lucas et al. ..................... 73/718 |
| 6,826,968 B2 * | 12/2004 | Manaresi et al. ........ 73/862.046 |
| 7,663,607 B2 | 2/2010 | Hotelling |
| 7,685,696 B2 * | 3/2010 | Raisanen ........................ 29/595 |
| 7,712,373 B2 * | 5/2010 | Nagle et al. ..................... 73/780 |
| 7,875,814 B2 | 1/2011 | Chen |
| 7,920,129 B2 | 4/2011 | Hotelling |
| 7,938,025 B2 * | 5/2011 | Shimomoto et al. ...... 73/862.046 |
| 7,980,145 B2 * | 7/2011 | Harish ..................... 73/862.626 |
| 7,990,160 B2 * | 8/2011 | Reynolds ..................... 324/686 |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,106,324 B2 * | 1/2012 | Lai et al. ....................... 200/600 |
| 8,169,332 B2 * | 5/2012 | Son ............................... 340/665 |
| 8,179,381 B2 | 5/2012 | Frey |
| 2006/0004289 A1 * | 1/2006 | Tian et al. ..................... 600/459 |
| 2006/0196281 A1 * | 9/2006 | Koors ...................... 73/862.626 |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Lisa Caputo
*Assistant Examiner* — Octavia Davis-Hollington
(74) *Attorney, Agent, or Firm* — Baker Botts LLP

(57) ABSTRACT

A sensor includes a first electrode and a second, compressible electrode. A dielectric layer separates the first electrode from the second electrode. At least one of the first and second electrodes compress responsive to force, increasing capacitance between the first and second electrodes.

21 Claims, 2 Drawing Sheets

FORCE SENSOR WITH COMPRESSIBLE ELECTRODE

BACKGROUND

Force sensors in touchscreens have typically utilized a compressible layer between two rigid electrodes. Force generated in touching the screen causes the compressible layer to compress, decreasing the distance between the two rigid electrodes. The decrease in distance results in an increase in capacitance between the two rigid electrodes, which is electrically sensed and representative of the force applied to the screen.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
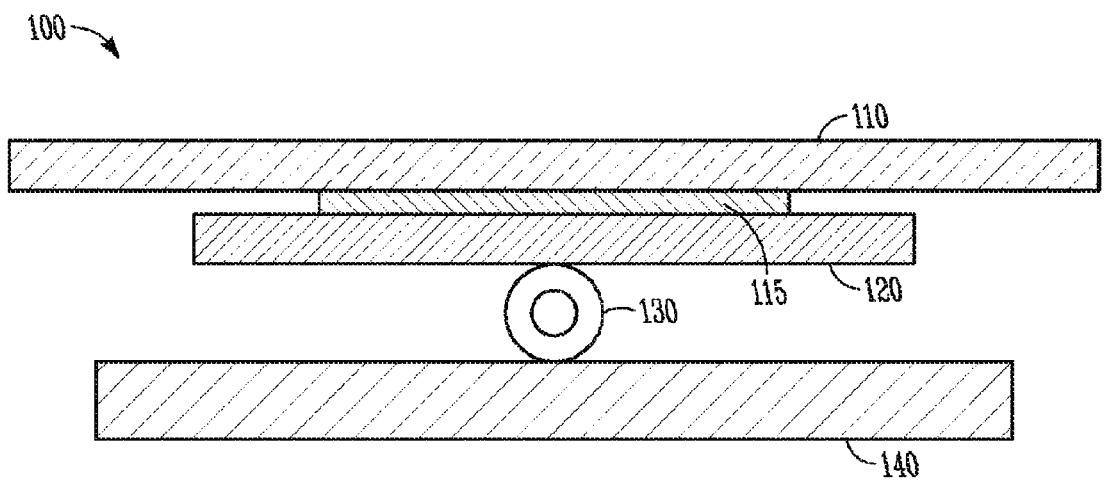
FIG. 1 is a block cross sectional diagram of a force sensor having a compressible electrode according to an example embodiment.

A force detector is shown generally at 100 in FIG. 1. In one embodiment, force detector 100 may be located on an upper surface of front panel 110 of a touch panel. A first electrode 115 may be located beneath the front panel 110, and may be a transmit electrode or a direct current planar structure in various embodiments. The first electrode 115 may be coupled or fixed to a substrate 120 in one embodiment. A second electrode 130 may be located between the substrate 120 and a support member 140.

Figure 2:
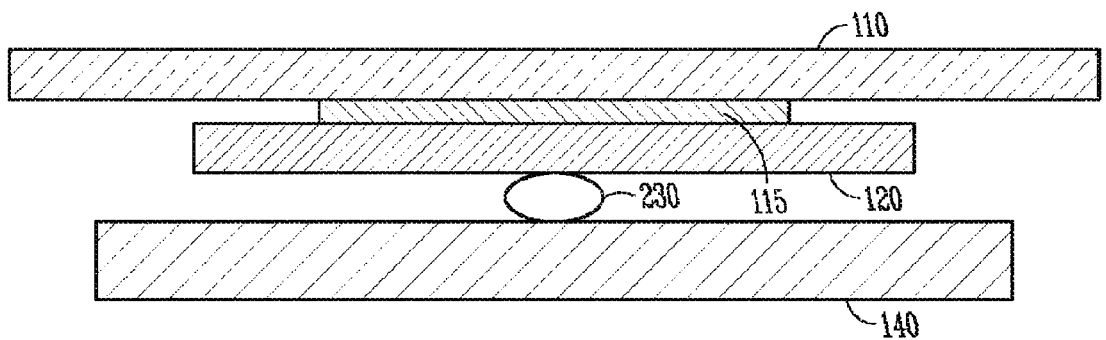
FIG. 2 is a block cross sectional diagram of the force sensor of FIG. 1 under pressure according to an example embodiment.

In one embodiment, the second electrode 130 is compressible, such that when force is applied to the front panel 110 above and proximate to the second electrode 130, the second electrode compresses as seen in FIG. 2 at 230, wherein the numbering is consistent with FIG. 1. Compression of the second electrode 130 essentially flattens it, increasing the relative surface area between the second electrode 130 and the first electrode 115. This causes an increase in capacitance between the two electrodes, as capacitance is a function of the area of opposing plates or electrodes and the distance between them. By compressing the second electrode 130 as seen at 230, both the area of the opposing electrodes is increased, and the average distance is decreased, as more of the second electrode 130 moves toward the substrate 120. In one embodiment, second electrode 130 may be formed as a compressible element with a cross section that tapers to become narrower close to the first electrode.

Second electrode 130 in one embodiment is formed of an elastic material that compresses in response to force, and rebounds to its original shape when the force is removed. It thus provides a varying area relative to the first electrode, corresponding to a measurable change in capacitance. In one embodiment, the second electrode is in the shape of a tube or cylinder, that provides sufficient resiliency to return to it original shape when the force from the front panel 110 is removed. In further embodiments, suitable springs may be interspersed about the second electrode to provide the force to return the electrode to its initial shape. The electrode may be retentatively attached to the substrate 120 and support member 140 to facilitates its return to the initial shape.

In one embodiment, the second electrode 130 is formed as a thin conductive gasket type material in the shape of a tube, perhaps 1-2 mm in diameter. The tube may be formed of carbon impregnated compressible material or metal loaded or coated neoprene or other soft compressible material. Similar materials are typically used for EMC shielding. As the tube is compressed, its surface area and proximity to the first electrode 115 changes, allowing capacitive measurement proportional to the applied force to be made.

In one embodiment, because the first electrode 115 faces upwards towards the touching/pressing object, and because the first electrode 115 is not itself touch sensitive, then the pressure exerted by the touching/pressing object is all that is detected by the force sensor, not the proximity of the touching/pressing object to the capacitive sensor. The first electrode 115 effectively acts to shield the lower compressible electrode 130 from capacitance changes caused by the proximity of the touching object. This has the advantage that the force sensor does not have to be further shielded from touch effects or placed further away from the touch in the mechanical arrangement. This allows far greater flexibility for the mechanical design and can allow a thinner overall assembly compared to existing solutions. It also allows for the first electrode 115 to be fabricated as part of a touch sensor that is sensitive to touch elsewhere over its upper area. In this way, for example, an XY touch sensor can be fabricated and on another area of the same sensor the first electrode of the force sensor created. This can be done using the same or different material from that used to form the touch sensor itself. The first electrode 115 may serve as a transmit electrode, and the second electrode 130 would then serve as a receive electrode.

The increase in surface area is due to the compression of the electrode as seen at 230, causing lateral expansion of the electrode 130. As the electrode expands laterally, more of the electrode contacts the substrate 120. The laterally expanded portions of the electrode 130 become more proximate to the first electrode 115, thus increasing overall capacitance.

In further embodiments, the positions of the first and second electrodes may be switched. Further layers may be included in further embodiments.

Figure 3:
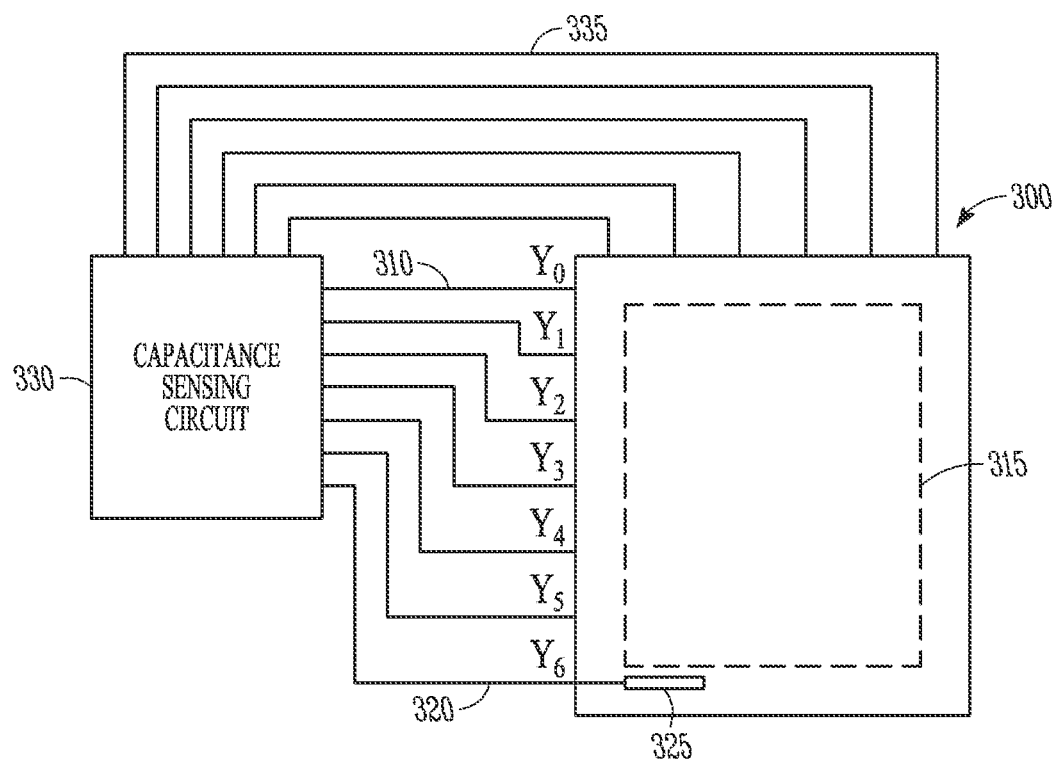
FIG. 3 is a block schematic diagram of a force sensor layout utilizing a spare drive line for a touchscreen according to an example embodiment.

FIG. 3 is a block schematic diagram of a force sensor layout 300 utilizing a spare drive line for a touchscreen according to an example embodiment. In layout 300, several receive lines are illustrated at 310, and labeled $Y_0, Y_1, Y_2, Y_3, Y_4, Y_5$, and $Y_6$. Many of the receive lines may be coupled to an XY sensor indicated generally by broken line 315. A spare receive line, $Y_6$, may be coupled to a compressible electrode 325. A capacitance sensing circuit 330 may be used for both the XY sensor 315 and compressible electrode 325, or a separate sensing circuit may be used for the compressible electrode 325, as the capacitance changes may or may not be consistent with those of the XY sensor. In one embodiment, circuit 330 also serves as a driver circuit for driving the first electrode 115 via drive lines indicated at 335.

For self capacitance embodiments, the first electrode 115 may be a conductive plane at a fixed DC potential, and the second compressible electrode 130 may be coupled to a self capacitance sensing circuit, such as circuit 330.

Figure 4:
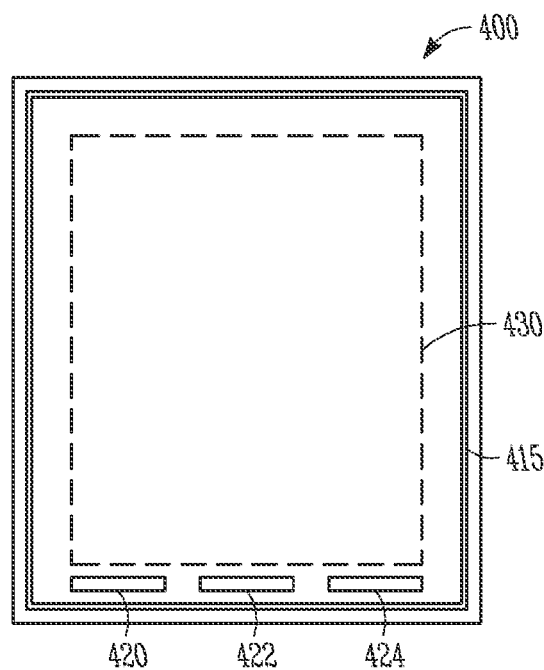
FIG. 4 is a block top view diagram of a touchscreen device incorporating one or more force sensors according to an example embodiment.

FIG. 4 is a block top view diagram of a touchscreen device 400 incorporating one or more force sensors according to an example embodiment. In one embodiment, a compressible electrode 415 may be disposed around the periphery of the touchscreen device 400 and in addition to acting as a force sensor, it may also provide a sealing function to keep moisture out of the touchscreen device 400. Further compressible electrodes 420, 422 and 424 may be disposed in one or more positions about the touchscreen device 400 where desired. An XY touchscreen indicated by broken line 430 may also be included in various embodiments. In one embodiment, an XY touchscreen comprises transmit electrodes and receive electrodes. In further embodiments, compressible electrode force sensors may be integrated with other components on a touchscreen, and may utilize similar or spare capacitive sense channels.

The invention claimed is:

1. A sensor comprising:
a first sensor portion comprising:
a first portion, the first portion comprising a plurality of electrodes arranged along a first axis, the first portion configured to detect a location with respect to the first axis of a touch on part of the first portion;
a second portion distinct from the first portion, the second portion comprising a first electrode;
a second sensor portion comprising a second electrode;
a dielectric layer separating the first electrode from the second electrode, wherein the second electrode compresses responsive to force such that the second electrode increases in surface area relative to the first electrode, increasing capacitance between the first and second electrodes.

2. The sensor of claim 1 wherein the second electrode is formed as a compressible tube or cylinder.

3. The sensor of claim 1 wherein the second electrode is formed as a compressible element with a cross section that tapers to become narrower close to the first electrode.

4. The sensor of claim 3 wherein the compressible tube or cylinder is formed of carbon impregnated compressible material.

5. The sensor of claim 3 wherein the compressible tube or cylinder is formed of a metal loaded or metal coated compressible material.

6. The sensor of claim 5 wherein the compressible material is neoprene.

7. The sensor of claim 1 and further comprising:
a front panel disposed over the first electrode opposite the dielectric layer; and
a support layer disposed under the second electrode opposite the dielectric layer.

8. The sensor of claim 1 wherein the second electrode compresses responsive to force, such that portions of the second electrode move closer to the first electrode.

9. The sensor of claim 1 wherein the first electrode is a conductive plane to couple to a DC potential.

10. The sensor of claim 9 and further comprising a self capacitance sensing circuit coupled to the second electrode.

11. The sensor of claim 1 wherein the first electrode is a transmit electrode for coupling to a driver circuit, and the second electrode is a receive electrode for coupling to a capacitive measurement circuit.

12. A system comprising:
a sensor comprising:
a first portion, the first portion comprising a plurality of electrodes arranged along a first axis, the first portion configured to detect a location with respect to the first axis of a touch on part of the first portion;
a second portion distinct from the first portion, the second portion comprising a transmit electrode;
a driver circuit coupled to the transmit electrode;
a receive electrode;
a capacitive measurement circuit coupled to the receive electrode; and
a dielectric layer separating the transmit electrode from the receive electrode;
wherein the receive electrode compresses responsive to force such that the receive electrode increases in surface area relative to the transmit electrode, increasing capacitance between the transmit and receive electrodes.

13. The system of claim 12 wherein at least one of the transmit electrode and receive electrode is formed as a compressible tube or cylinder.

14. The system of claim 13 wherein the compressible tube or cylinder is formed of carbon.

15. The system of claim 13 wherein the compressible tube or cylinder is formed of a metal loaded or metal coated compressible material.

16. The system of claim 12 and further comprising:
a front panel disposed over the transmit electrode opposite the dielectric layer; and
a support layer disposed under the receive electrode opposite the dielectric layer.

17. The system of claim 12 wherein the receive electrode compresses responsive to force, such that portions of the receive electrode move closer to the transmit electrode.

18. A method comprising:
forming a sensor between a front panel and a substrate, the sensor comprising:
a first portion, the first portion comprising a plurality of electrodes arranged along a first axis, the first portion configured to detect a location with respect to the first axis of a touch on part of the first portion;
a second portion distinct from the first portion, the second portion comprising a first electrode;
forming a second electrode in capacitive relationship with the first electrode between the substrate and a support, wherein the second electrode is formed such that the second electrode compresses responsive to force and increases in surface area relative to the first electrode; and
wherein the capacitance between the first and second electrodes increases responsive to force applied to the front panel proximate the first and second electrodes.

19. The method of claim 18 wherein the second electrode is formed as a compressible tube.

20. The method of claim 18 and further comprising:
providing a front panel disposed over the first electrode opposite the substrate; and
providing a support layer disposed under the second electrode opposite the substrate.

21. The method of claim 18 wherein the second electrode is formed such that it compresses responsive to force, and portions of the second electrode move closer to the first electrode.

* * * * *

UNITED STATES PATENT AND TRADEMARK OFFICE
CERTIFICATE OF CORRECTION

Page 1 of 1

PATENT NO.        : 8,621,942 B2
APPLICATION NO.   : 12/534753
DATED             : January 7, 2014
INVENTOR(S)       : Peter Sleeman It is certified that error appears in the above-identified patent and that said Letters Patent is hereby corrected as shown below:

In the Claims

Col. 4, Ln. 57: After "and" and before "comprising" delete "farther" and insert --further--.

Signed and Sealed this
Seventh Day of October, 2014

Michelle K. Lee
*Deputy Director of the United States Patent and Trademark Office*